Aug. 23, 1955 W. R. AYRES 2,716,189
FREQUENCY SELECTIVE CIRCUIT
Filed Sept. 30, 1952 4 Sheets-Sheet 1
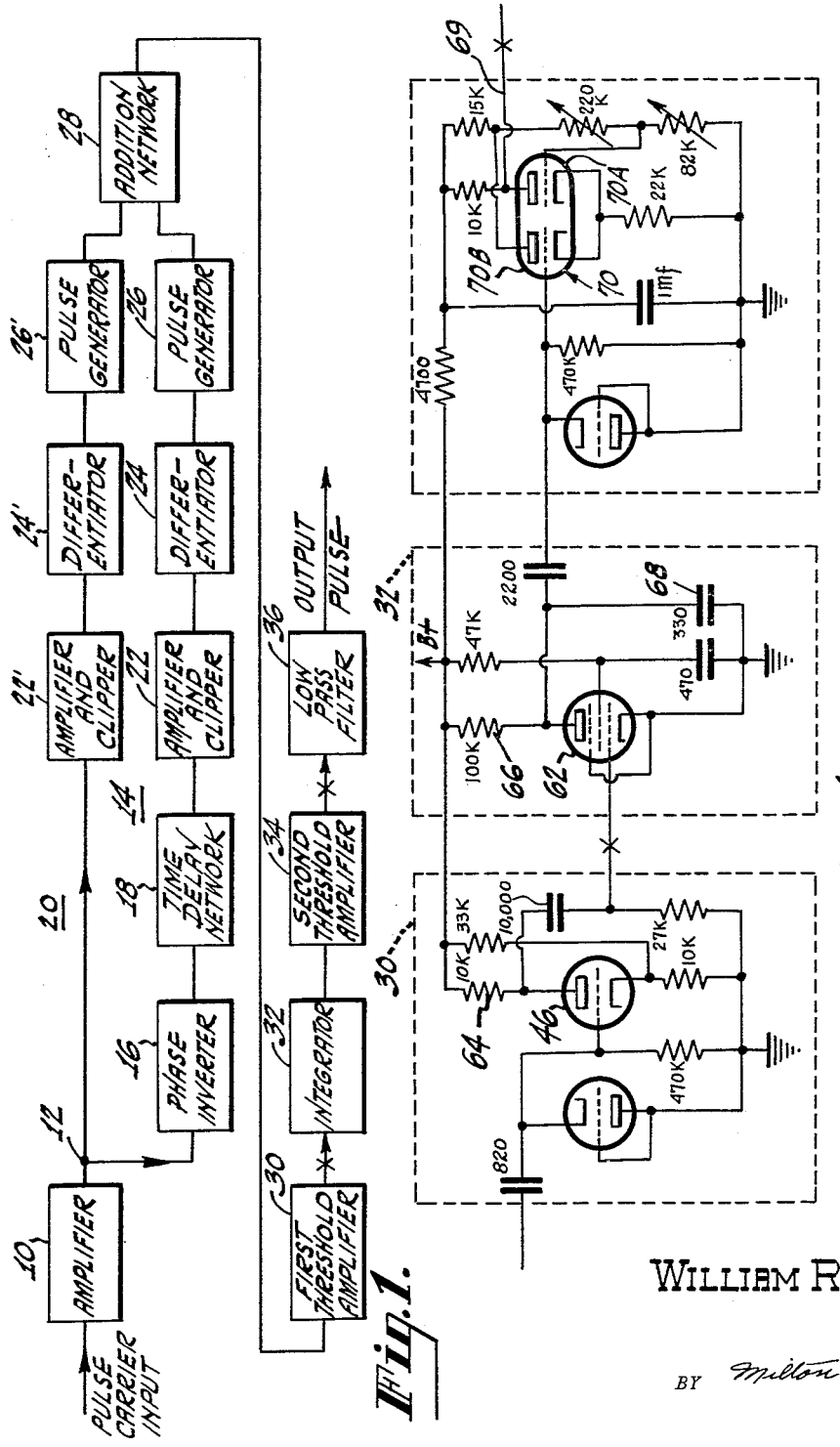
INVENTOR.
WILLIAM R. AYRES
BY Milton S. Winters
ATTORNEY

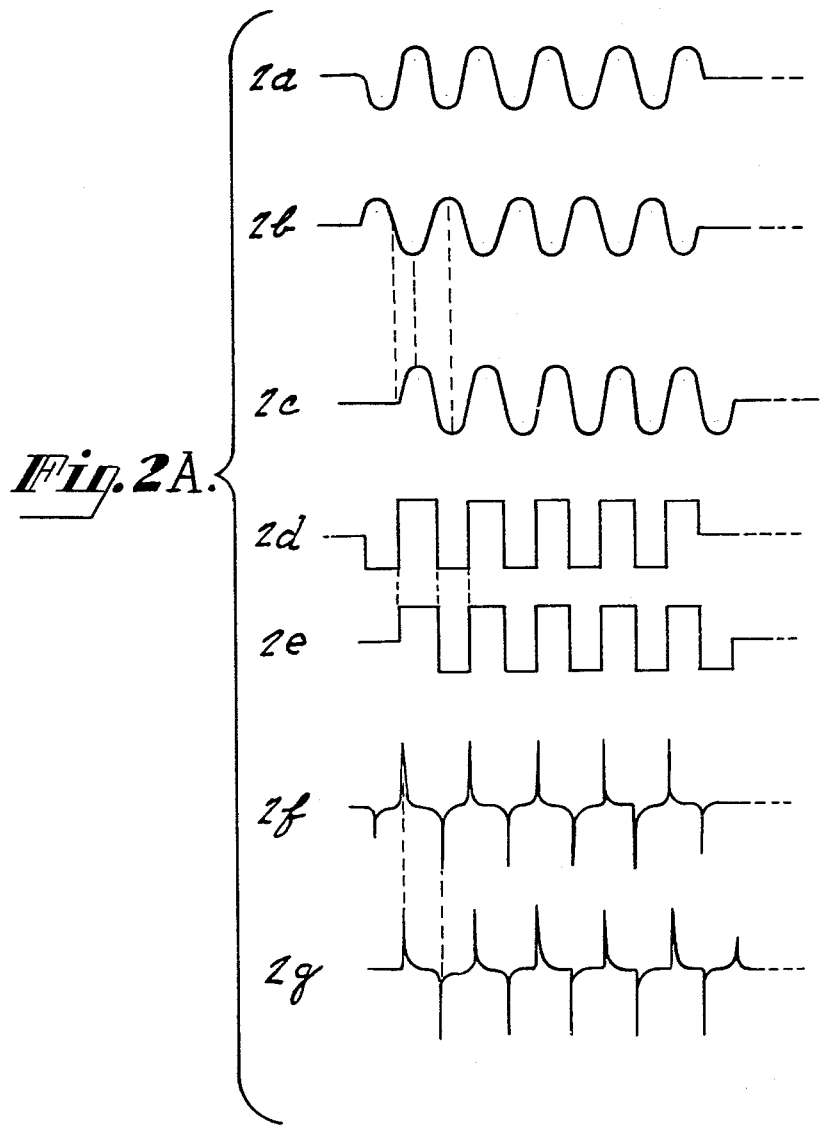

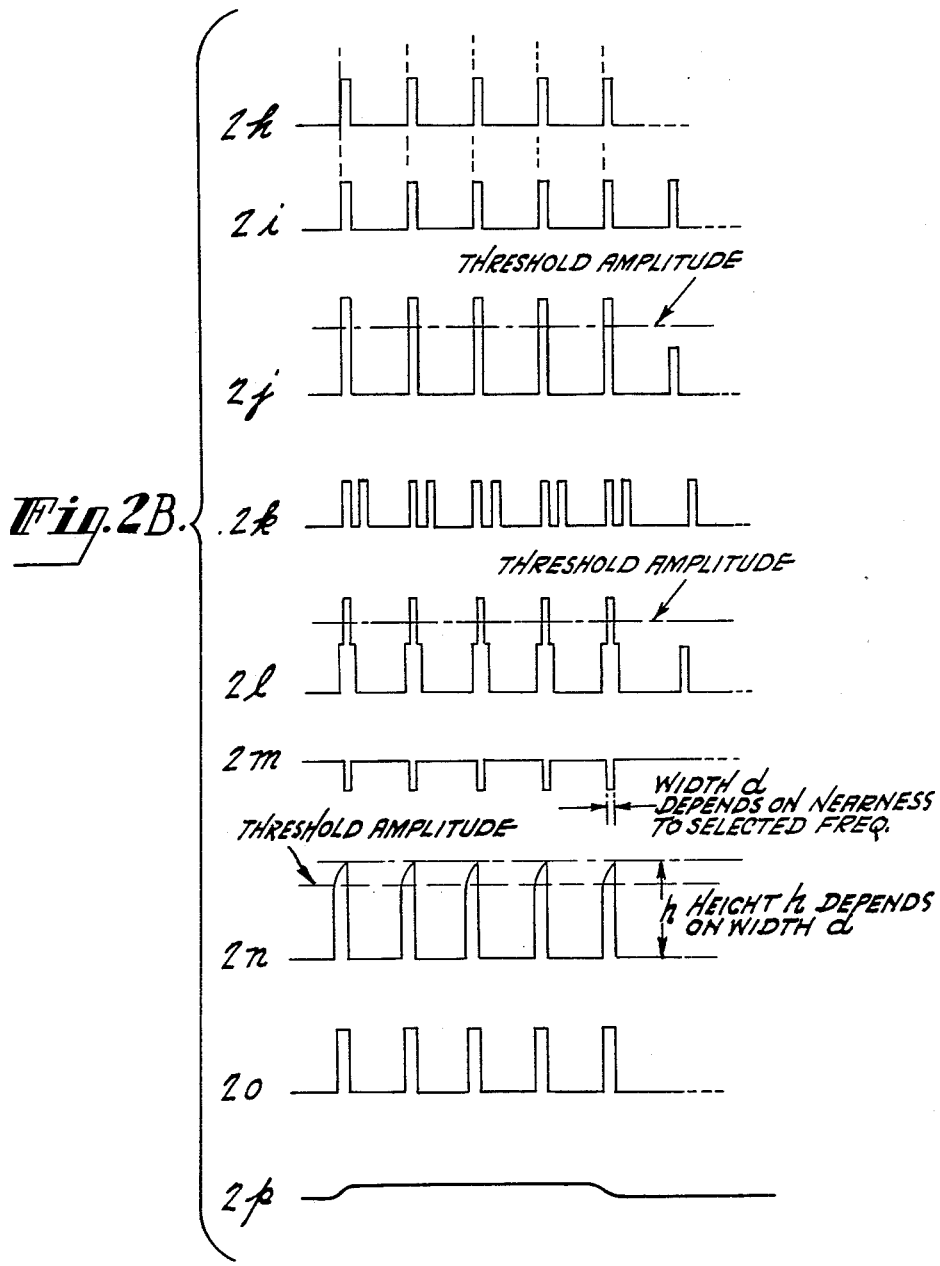

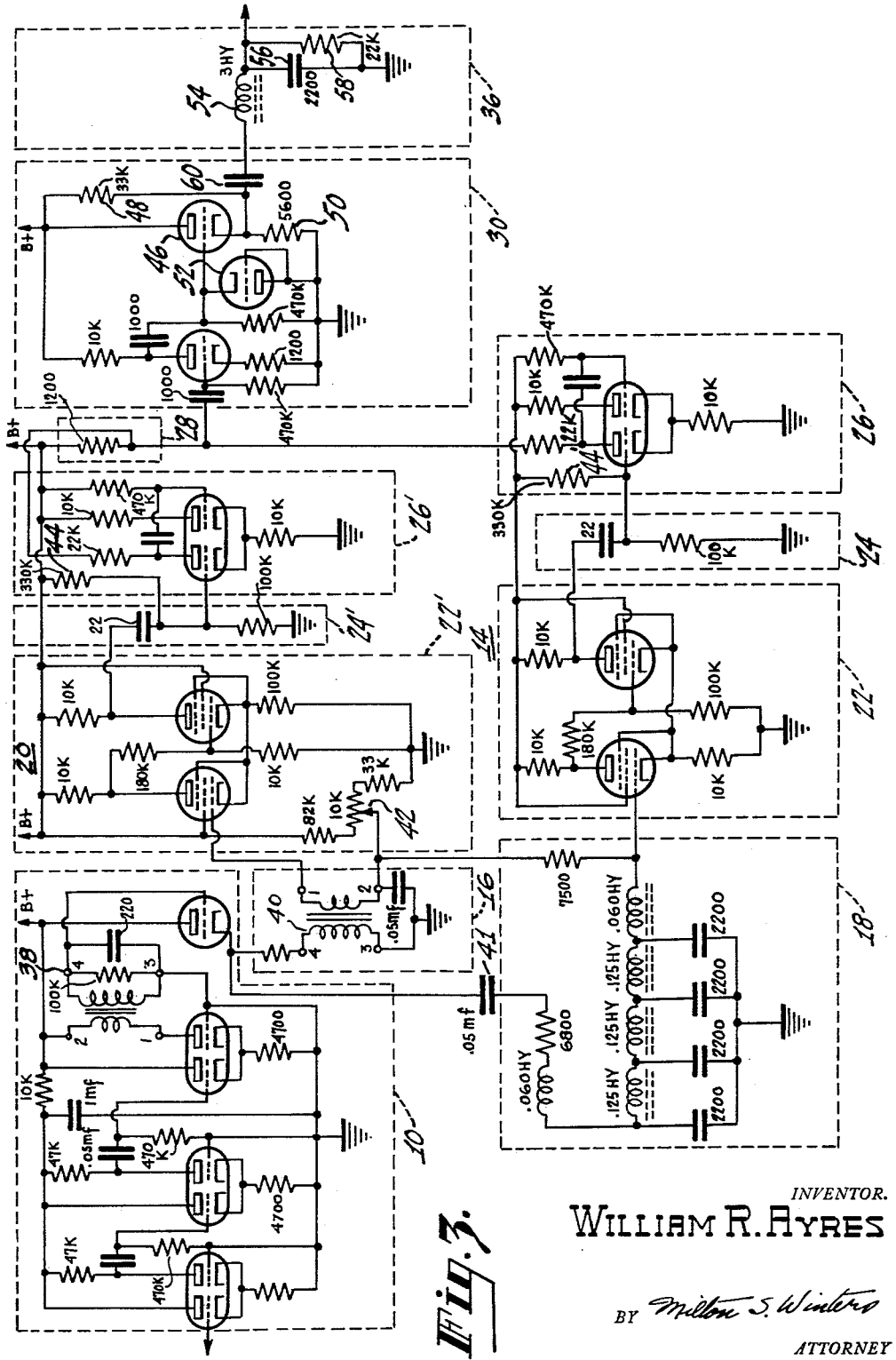

Patented Aug. 23, 1955

2,716,189

FREQUENCY SELECTIVE CIRCUIT

William R. Ayres, Oaklyn, N. J., assignor to Radio Corporation of America, a corporation of Delaware Application September 30, 1952, Serial No. 312,325

9 Claims. (Cl. 250—27)

The present invention relates to frequency selective circuits, and particularly to a frequency selective circuit having high discrimination against noise impulses. In another aspect, the invention is also related to pulse coincidence circuits.

In pulse radar (radio echo detection and ranging) and pulse sonar (sound echo detection and ranging) receivers, a high "Q" resonant network, tuned to a pulse carrier frequency, is ordinarily employed. The purpose of such network is to secure high selectivity in favor of the signal, and high discrimination against noise and other frequencies.

The invention may also be utilized in a railway signalling system of the type disclosed in my prior copending application Serial No. 167,415, entitled Railway Signalling, filed June 10, 1950, now abandoned. In such a system, a carborne receiver picks up pulsed carrier signals from wayside generators spaced along the right-of-way and transmitted along the rails or other transmission line. The pulses from each generator are spaced in time from the pulses of closely adjacent generators. By counting the number of pulses received per second, the carborne receiver gives an indication of the number of generators between this receiver and a short-circuit, such as caused by another train, in advance of the car. Improvement in such selectivity and discrimination is highly desirable.

It is an object of the present invention to improve the selectivity in favor of a selected signal frequency and the discrimination against other frequencies.

It is another object of the invention to improve the selectivity of reception in favor of pulse modulated carrier waves.

It is a further object of the invention to provide a novel circuit for selective reception in favor of a selected carrier wave.

A still further object of the invention is to provide a novel circuit for selective reception in favor of a selected pulse modulated carrier wave.

The foregoing and other objects, advantages, and novel features of the invention will be more fully apparent from the following description when taken in connection with the accompanying drawing in which like reference numerals refer to like parts, and in which:

Fig. 1 is a diagram in schematic block form, illustrating a preferred embodiment of the invention;

Fig. 2, including Figs. 2a to 2p, are wave forms useful in understanding the operation of the embodiment illustrated in Fig. 1;

Fig. 3 is a circuit diagram in schematic form illustrating in greater details the circuit shown in block form in Fig. 1, modified with some blocks omitted; and Fig. 4 is a circuit diagram in schematic form illustrating details of the circuits which, with a portion of Fig. 3, complete the omitted blocks of Fig. 1.

According to the invention, particularly as applied to pulse carrier reception, the received signal is applied to two channels. The signal in one channel is delayed a half (or odd multiple of a half) period corresponding to the carrier frequency and also inverted in one channel or the other. The signal in each channel is squared and differentiated. The differentiated signals are recombined and applied to a threshold circuit responsive only to signals of a predetermined amplitude. Thus the circuit according to the invention requires the carrier frequency to be at the desired value. Second, both polarities of the desired signal must be present before the threshold circuit is actuated.

A further feature of the invention resides in an integrating circuit to receive the output of this first threshold circuit and a second threshold circuit to which the output of the integrating circuit is applied. By this further means, as will be more apparent hereinafter, exactness of coincidence of pulses applied to the first threshold circuit may be made substantially as stringent as desired, depending on the rapidity of action of the first threshold circuit, the proper selection of response time for the integrating circuit, and the sensitivity of the second threshold circuit.

Referring to Fig. 1 of the drawing, the pulse carrier input is received at an amplifier 10. The signal is divided at a junction 12. In one channel, 14, the signal is inverted by a phase inverter 16, and delayed by a half cycle at the carrier frequency in a time delay network 18.

The remaining components of the two channels may be alike. The other channel 20 has an amplifier and clipper 22' to which the signal is applied from junction 12. An amplifier and clipper 22 (like the amplifier and clipper 22') receives signal from the output of the time delay network 18. In the channel 14 are a differentiator 24 and pulse generator 26 connected successively following the amplifier and clipper 22. Differentiator 24', like differentiator 24, and pulse generator 26' like pulse generator 26, are connected in channel 20 successively following amplifier and clipper 22'.

The outputs of the pulse generators 26 and 26' are applied to a pulse addition network 28, and then applied to a first threshold amplifier 30, which responds only to pulses having an amplitude greater than a predetermined value. Consequently, unless the carrier frequency of the incoming wave has been sufficiently close to that to be selected the threshold amplifier 30 is not actuated. The phase shift between the two channels 14 and 20 must be one-half cycle at the carrier frequency to provide a sufficient amplitude to actuate the threshold amplifier 30.

The output pulses of the threshold amplifier 30 are applied to an integrator 32, and a second threshold amplifier 34 is connected to receive the integrator output. The integrator 32 integrates the successive pulses from the first threshold amplifier at the carrier frequency rate, and has, however, a time constant which permits recovery at the pulse repetition frequency before the next pulse of carrier waves is received. By setting the threshold value of the second threshold amplifier 34 at a desired amplitude, the exactness of coincidence of pulses from the two channels 14 and 20, and the closeness of the carrier frequency to that necessary to provide exactly a half cycle phase shift between the two channels 14 and 20, may be made as stringent as desired. The second threshold amplifier is connected to apply its output to a low pass filter 36. The low pass filter provides a single pulse output for each pulse of carrier wave.

Although the integrator and second threshold amplifier may be omitted, and the points indicated by X connected together in the diagram, these are desirably included, especially where the degree of coincidence to be required of the pulses applied at the addition network is to be adjustable.

The operation of the circuit will be more apparent from the idealized curves of Fig. 2 comprising as parts Fig. 2A and Fig. 2B. In these, it will be understood that only one carrier pulse is shown. In practice there may be a plurality of carrier pulses occurring usually at some definite and regular pulse repetition frequency, or separated by an interval at least of the same order of magnitude in time as the time direction of the pulse. However, the detection of the selected carrier frequency is general, whether there is a pulsed or continuous signal.

In the specific example described herein and for the wave shapes illustrated in Fig. 2 assume the carrier frequency to be 8,000 C. P. S. (cycles per second) with a pulse duration of 5 cycles at this frequency. The nominal pulse duration is thus 5/8,000 second or 625 microseconds. The dead space between pulses is one pulse width or thereabouts. The example corresponds in these respects to the example described in my said copending application. Further, the circuits here disclosed may be used in the carborne receiver of railway signalling system there disclosed. For example, neglecting the improvement disclosed in that application, and using a single pick-up for a single rail, or a single pick-up applying in aiding relationship the voltage from coils coupled to both rails, the incoming signal may be applied to the amplifier 10 of this application. The output from the low pass filter 36 which may correspond closely to the input signal demodulated, may be applied to the integrator 118 of Fig. 4 of that application. To those skilled in the art, other uses of the invention will be apparent where high selectivity for a selected frequency or where a high degree of coincidence of pulses is desired.

Referring to Fig. 2, and to part 2A, the horizontal axis is taken as the time axis and the vertical axis as the amplitude axis. Line 2a illustrates the waveform of an incoming pulse of carrier frequency signal, which may be illustrated also of the output of amplifier 10. Line 2b is the waveform from the output of phase inverter 16. Line 2c is the waveform of the output of the time delay network 18. Lines 2d and 2e, show the waveforms, respectively, of the output of amplifier and clippers 22' and 22. Lines 2f and g show the waveforms, respectively, of the outputs of differentiators 24' and 24. Throughout Fig. 2, vertical dotted lines indicate time correspondence.

Referring to part 2B of Fig. 2, lines 2h and 2i show the waveforms, respectively, applied to the addition network from pulse generators 26' and 26. Line 2j shows the sum waveform applied from the addition network 28 to the first threshold amplifier 30 input (and also showing the threshold amplitude) resulting from input signals at the selected carrier frequency. For this frequency, the pulses of lines 2h and 2i are in coincidence. Line 2k shows a possible output of the addition network 28 for a carrier pulse applied to amplifier 10 which is off frequency.

Line 2l shows the waveform at the output of the addition network to be expected in the event that the input carrier frequency at amplifier 10 is very near the selected frequency, but not exactly equal to it. The result is that the pulses of lines 2h and 2i are somewhat displaced along the horizontal time axis, but still have portions in coincidence. Line 2m shows the waveform of the output of the second threshold amplifier 34. Line 2n shows the waveform of the output from the integrator 32, and line 2o of the output of the second threshold amplifier. The threshold is not reached by the waveform of Fig. 2n, applied to the second threshold circuit, if the output of the first threshold amplifier is not of sufficiently long duration (if the width d does not exceed a certain width). In turn the width d depends on the overlay or degree of coincidence of the pulses of lines 2h and 2i. Hence, by adjusting the threshold, the degree of pulse coincidence required to actuate the second threshold circuit may be adjusted.

However, the integrator 32 and second threshold amplifier 34 may be omitted, as will appear more fully hereinafter, if the degree of coincidence which may be secured by including them is not desired. Either the pulses of line 2m or those of line 2o, if applied to the low pass filter at the repetition frequency assumed, will provide one output pulse, waveform shown at line 2p, for each input pulse at the carrier frequency applied at amplifier 10.

Referring to Fig. 3, the circuit details correspond to the circuit shown in block form, but with the integrator 32 second threshold amplifier 34 omitted in the manner described above. Also, the phase inverter in Fig. 3 is placed in channel 20. A common ground connection, not shown in Fig. 1, is conventionally shown in Fig. 3. The parts corresponding to the blocks in Fig. 1 are shown in dotted lines in Fig. 3. Circuit values are indicated on the drawing in numerals smaller than the reference numerals adjacent the element. For capacitors, the values are micro-microfarads unless indicated as MF (microfarads). Resistor values are in ohms unless indicated as K (thousands of ohms). The pentode tubes shown are RCA type 5693 and the triodes are sections of RCA type 5692. No voltage supply is shown, but a well regulated supply, the B+ value being 150 volts with respect to ground is recommended. This circuit was built and tested, and operated well. In view of the completeness of detail thus afforded by Fig. 3 only a brief description of the circuit follows.

The amplifier 10 includes three stages of limiting amplifiers, similar to those disclosed in the patent to Crosby, 2,276,565. At the output of the final stage of the Crosby amplifier is a broadly tuned resonant circuit 38 followed by a cathode follower output. The purpose of this resonant circuit 38 is so that the signal applied to succeeding stages will be essentially sinusoidal in character. The large amplification in amplifier 10 of signals of great amplitude disparity may otherwise cause some of them to be clipped, and assume a different form without the resonant circuit 38. At 8,000 C. P. S. and balanced clipping, the third harmonic is the most significant. The resonant circuit easily filters out this third and higher harmonics preserving the amplified fundamental, of largely constant amplitude.

It is immaterial whether the phase inverter 16 is in channel 20 or 14. Inversion is accomplished through the transformer 40 of Fig. 3 in channel 20.

The capacitor 41 is simply a voltage block capacitor, and passes the voltage from amplifier 10 to channel 14 substantially without change of waveshape.

The time delay network 18 is exemplified by a delay line in the form of lumped capacitance and inductance elements. The time delay provided by this line 62.5 microseconds. A distributed delay line could be employed. The transformer 40 is a step-down transformer. Thus the voltages presented to the amplifier and clipper 22' are made about equal to that presented to amplifier and clipper 22. The step-down compensates for attenuation in the delay line.

Amplifier and clipper 22 or 22' each include two-pentode variations of a bi-stable multivibrator circuit. The threshold point of these bi-stable multivibrators is set in both channels by a common control 42, which adjusts the bias voltage on the input grids of the multivibrator circuits. Preferably, the setting of control 42 is to place the threshold of the multivibrators slightly below the threshold voltage of the circuit. This will cause the circuits to respond substantially instantly to input signals.

The differentiator circuit 24 or 24' is one of ten employed, being a suitably selected resistor-capacitor combination. The resistor of each combination also serves in addition as grid resistor for the succeeding stage. The resistor 44 with the resistor of differentiator 24 and resistor 44' with the resistor of differentiator 24' provide respectively voltage divider networks for application of suitable voltages to the input grids of the succeeding stage.

Each of the pulse generators 26' or 26 is a monostable cathode-coupled multivibrator, triggered only by positive going signals respectively from the differentiator 24' or 24.

The addition network 28 is in this case simply a resistor common to the anode circuits of the input sections of the multivibrator of pulse generators 26' and 26. Under circumstances involving higher frequency components, it may be desirable to use known types of compensation in the addition network 28. However, the simple resistor here employed was found adequate for the frequencies here involved.

It will be noticed that the wave shapes are inverted from those illustrated in Figs. 2g, 2h, and 2i. However, such inversion is immaterial with respect to the principles of the invention, as will be understood by those skilled in the art.

The first threshold circuit 30 includes first an ordinary amplifier stage to amplify the added signals, and also invert them to positive pulses. The amplified signals are applied to a cathode follower stage including a triode 46 cathode biased beyond cut-off. This cathode bias is provided by serially connected resistors 48 and 50 connected between the B+ supply and ground. The junction of the resistors is connected to the cathode of triode 46. Resistor 50 serves also as a cathode follower load resistor in the triode 46 cathode circuit. The diode connected triode 52 as a so-called "clamper." Thus the grid bias level is not shifted as a result of signal asymmetry.

Because of the bias on the cathode follower circuit of triode 46, no output is developed across load resistor 50 unless the input amplitude to triode 46 exceeds a predetermined amplitude threshold level. This threshold level is selected so that when, and only when, pulses are coincidentally added by the addition circuit (resistor) 28, does triode 46 conduct and provide an output pulse.

The positive going output pulses from the first threshold circuit 30 are applied to a low pass filter 36 comprising an inductor 54, capacitor 56 and resistor 58. The capacitor 60 is simply a blocking capacitor which passes all frequency components of interest. The low pass filter provides a pulse for each group of input pulses, as it filters out the 8,000 C. P. S. component.

In Fig. 4, as in Fig. 3, dotted lines indicate the block components shown in Fig. 1. Circuit values are indicated on the drawing in numerals adjacent the element, in the same manner in Fig. 4 as in Fig. 3. In Fig. 4, tube types are, as in Fig. 3, RCA type #5693 for pentodes and sections of RCA type 5692 for triodes.

Fig. 4 includes a schematic of the integrator 32 and the second threshold amplifier 34, optional in Fig. 1.

The integrator 32 is a pentode 62 biased to be normally conductive. The input is required to be a negative going pulse. Therefore, to insert this circuit directly in Fig. 3 at the points marked X requires some modification. An inverter stage (not shown) may be inserted prior to the pentode circuit illustrated. An alternative is to modify the first threshold circuit 30 in the manner illustrated in Fig. 4. Instead of a cathode follower stage, an anode load resistor is provided so that the first threshold circuit triode 46 in Fig. 4 inverts as well as amplifies. The threshold triode 46 is cathode biased beyond cut-off in much the same manner as the first threshold circuit triode 46 in Fig. 3, by a voltage divider system between B+ and ground. This arrangement also provides some signal amplification greater than unity, which is desirable because the integrator will operate more efficiently with signals of substantial amplitude.

The first integrator is exemplified by a pentode 62 operating with a grounded cathode, a high anode load resistance 66, and a suitably selected anode to ground capacitor 68.

Normally, anode current flows and the anode potential is at a low value relative to the B+ supply. During a control grid signal of negative polarity, and of sufficient amplitude to cut-off this anode current flow, the capacitor 68 charges exponentially through the anode load resistor 66. The time constant of the anode resistor 66 and capacitor 68 to ground provides integration over the expected time of duration of the signal which may be of the order of one-tenth cycle at carrier frequency. In this instance, this time constant must provide integration over the time of the desired minimum duration d of the negative going pulse applied to the integrator grid. At the same time, the capacitor 68 in which the current flow is integrated, must be small enough to allow a substantial increase of voltage in this time of charge or current flow. The values illustrated for resistor 66 (100 K ohms) and capacitor 68 (330 micro-microfarads) are suitable for the triggering potential of the following threshold amplifier, and for the width of pulse d to be at least about 10 microseconds. Further, the integrator recovers promptly to be ready to integrate the next succeeding pulse. The resulting integrated wave form is illustrated in Fig. 2n. The duration of the pulse supplied from the first threshold circuit must be sufficient to cause the integrated voltage to exceed the threshold voltage of the second threshold circuit. Otherwise the second threshold circuit does not respond. By adjusting the threshold of the second threshold circuit, the requirement for coincidence at the first threshold circuit may be made as stringent as required. In this connection, it should be recognized that the first threshold circuit preserves intact at its output the width of pulse above its threshold voltage at its input. Such adjustment may be made by variation of the value of capacitor 68, or by adjustable grid resistor to vary the grid bias, as shown. Other suitable adjustments, for example, to vary the anode voltage to the second threshold circuit, will be known to those skilled in the art.

The second threshold circuit is a bistable multivibrator which remains in one stable condition with one section 70A of double triode 70 conductive unless and until the voltage applied at the grid of the other triode section 70B exceeds a threshold value. Then the other section 70B conducts until the voltage applied to its grid is less than the threshold value, whereupon the circuit instantly returns to its normal stable state. The diode-connected triode in the grid circuit of section 70B serves as a "clamper" to keep the base-line of the grid signal at ground potential.

The output from the second threshold circuit may be taken by a connection 69 to the anode of the normally conducting section 70A. Thus the output is a series of positive pulses, four for each five cycles of carrier input pulse. These may be applied directly to the filter circuit illustrated in Fig. 3, or preferably after passage through a pulse-stretcher of, say, mono-stable multivibrator form, which changes these very narrow pulses to wider pulses of higher energy value. Output of filter 36 could be materially increased thereby.

It will be apparent from the foregoing that there is disclosed herein a means of high selectivity in favor of a signal of selected frequency.

What is claimed is:

1. A system for selective response to a sinusoidal signal of a predetermined frequency included in a received signal, comprising two distinct channels to each of which the received signal is applied, means to phase invert the signal in one channel with respect to that of the other, means in one channel to delay the signal a time equal to a half period at the said predetermined frequency, each channel comprising means to transform the sinusoidal signal into a square wave signal and means to differentiate the said square wave signal, means to add the differentiated pulses of one polarity from both channels, and a threshold circuit responsive to a given amplitude value exceeding the amplitude of a single differentiated pulse.

2. A system for selective response to a sinusoidal signal of a predetermined frequency included in a received signal, comprising two distinct channels to each of which the received signal is applied, means to phase invert the signal in one channel with respect to the signal in the other channel, means in one channel to delay the signal a time equal to a half period at the said predetermined frequency, each channel comprising means to transform the sinusoidal signal into a square wave substantially constant amplitude signal, means to differentiate the said square wave signal to provide for each cycle thereof a pair of pulses of opposite polarity, one of one polarity corresponding to the rise and one of an opposite polarity corresponding to the fall of the square wave signal and means to produce secondary pulses of substantially constant amplitude and of one polarity in response to the pulses of one polarity of each pair, means to add the said secondary pulses, and a threshold circuit responsive to a predetermined amplitude value exceeding the amplitude of a single secondary pulse.

3. A system for selective response to a sinusoidal pulse modulated signal of a predetermined carrier frequency included in a received signal, comprising two distinct channels to each of which the received signal is applied, means to phase invert the signal in one channel with respect to the signal in the other channel, means in one channel to delay the signal a time equal to a half period at the said predetermined frequency, each channel comprising means to transform the sinusoidal signal into a square wave substantially constant amplitude signal, means to differentiate the said square wave signal to provide for each cycle thereof a pair of pulses of opposite polarity, one of one polarity corresponding to the fall of the square wave signal and means to produce secondary pulses of substantially constant amplitude and of one polarity in response to the pulses of one polarity of each pair, means to add the said secondary pulses, and a threshold circuit responsive to a predetermined amplitude value exceeding the amplitude of a single secondary pulse, and a low pass filter to receive the output of said threshold circuit.

4. A system for selective response to a sinusoidal signal of a predetermined frequency included in a received signal, comprising two distinct channels to each of which the received signal is applied, means to phase invert the signal in one channel with respect to the signal in the other channel, means in one channel to delay the signal a time equal to a half period at the said predetermined frequency, each channel comprising means to transform the sinusoidal signal into a square wave substantially constant amplitude signal, means to differentiate the said square wave signal to provide for each cycle thereof a pair of pulses of opposite polarity, one of one polarity corresponding to the rise and one of an opposite polarity corresponding to the fall of the square wave signal and means to produce secondary pulses of substantially constant amplitude and of one polarity in response to the pulses of one polarity of each pair, a first threshold circuit responsive to a given amplitude and having an output preserving the time duration of the portion of the added pulses exceeding its threshold value, an integrating circuit to receive and integrate individually the pulse output of said first threshold circuit, and a second threshold circuit to receive the output of said integrating circuit and responsive to a second predetermined amplitude value.

5. The system claimed in claim 4, said second threshold circuit having at least one adjustable element to adjust said second predetermined amplitude value.

6. A pulse coincidence circuit comprising an addition circuit for adding in like polarity the pulses coincidence of which is to be determined, a first threshold circuit to receive the added pulses and responsive only when the amplitude of the added pulses exceeds a predetermined value and having an output preserving the time duration of the portion of the added pulses in excess of the said predetermined amplitude, an integrating circuit to receive and integrate the individual output pulses from said first threshold circuit, and a second threshold circuit to receive the output of said integrating circuit and responsive to a second predetermined amplitude value, whereby said second value determines the degree of coincidence of said first mentioned pulses to which said second threshold circuit responds.

7. The circuit claimed in claim 6, said second threshold circuit being adjustable to adjust said second predetermined amplitude value.

8. The circuit claimed in claim 6, said first threshold circuit comprising a circuit having an amplifying element having cathode, anode, and control elements and means to bias said element beyond cut-off to be normally nonconductive.

9. The circuit claimed in claim 6, said integrating circuit comprising an amplifying element having cathode, anode, and control elements and means to bias said element to be normally conductive, an anode circuit for said element including an anode load resistor, and an integrating capacitor connected between said anode and said cathode, whereby integration results from the charge of said capacitor through said resistor on cut-off of said element by the received pulses to be integrated.

References Cited in the file of this patent

UNITED STATES PATENTS 2,118,626    Smith                May 24, 1938